United States Patent
Dieudonné et al.

(10) Patent No.: US 8,150,388 B2
(45) Date of Patent: Apr. 3, 2012

(54) METHOD FOR TESTING A NAVIGATION RECEIVER

(76) Inventors: Michael Dieudonné, Leuven (BE); Tom Vandeplas, Rotselaar (BE); Wim Cresens, Linden (BE)

( * ) Notice: Subject to any disclaimer, the term of this patent is extended or adjusted under 35 U.S.C. 154(b) by 1048 days.

(21) Appl. No.: 11/881,661

(22) Filed: Jul. 27, 2007

(65) Prior Publication Data

US 2008/0085704 A1    Apr. 10, 2008

(30) Foreign Application Priority Data

Oct. 5, 2006    (GB) .................................. 0619634.9

(51) Int. Cl.
*H04W 24/00* (2009.01)
(52) U.S. Cl. .................................. 455/423; 342/357.64
(58) Field of Classification Search .................. 455/423; 342/357.64

See application file for complete search history.

(56) References Cited

U.S. PATENT DOCUMENTS

2003/0148761 A1    8/2003    Gaal
2004/0006444 A1    1/2004    Kang et al.

OTHER PUBLICATIONS

Search Report dated Dec. 13, 2006.

*Primary Examiner* — Marcos Batista

(57) ABSTRACT

The present invention is related to a method for testing a navigation receiver comprised in a communication device, whereby the communication device further comprises a device for mobile wireless communication. The method comprises the steps of:

connecting the communication device to a test equipment device, sending navigation assistance data information comprising test configuration data from the test equipment device via the device for mobile wireless communication to the navigation receiver over an assistance data communication port in order to initiate a test procedure, sending test navigation ranging signals from the test equipment device to the navigation receiver, processing the test navigation ranging signals in the navigation receiver, sending a message concerning the test procedure in response from the navigation receiver to the device for wireless mobile communication, feeding back the message to the test equipment device.

13 Claims, 3 Drawing Sheets

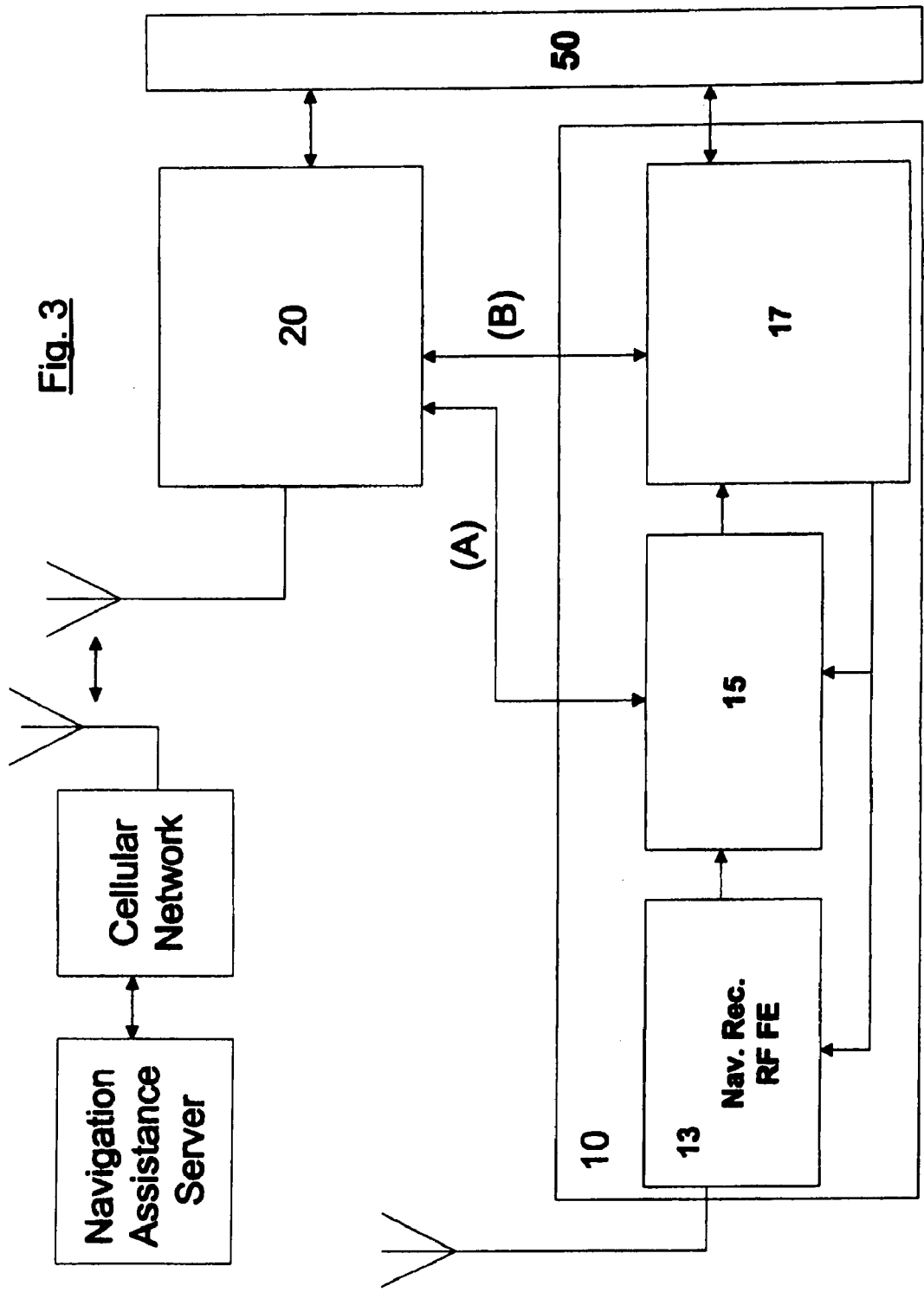

METHOD FOR TESTING A NAVIGATION RECEIVER

This application claims priority from United Kingdom Patent Application No. 0619634.9, filed on 5 Oct. 2006, which is incorporated by reference in its entirety.

The present invention relates to a method for testing a communication device provided with additional receiver-only capabilities. More particularly, it discloses a method for testing a navigation receiver belonging to said communication device.

BACKGROUND

A global navigation satellite system comprises, among other things, a so called constellation of multiple navigation satellites, which are orbiting the earth and which each transmit dedicated navigation signals also called 'ranging signals'. Global navigation satellite systems can be: the NAVSTAR Global Positioning System (GPS), the Global'naya Navigatsionnaya Sputnikovaya Sistema (GLONASS) (which is actually translated into Global Navigation Satellite System but which is not to be confused with GNSS), Galileo or any future navigation satellite constellation.

Global navigation satellite signal reception functionality enables a device to receive, acquire and track the global navigation satellites' ranging signals. Global navigation satellite signal processing functionality further enables the act of determining geographic position (positioning), location (locating) and course of any person, vessel or object equipped with a navigation receiver. This functionality is also generally called the Position, Velocity and Time (PVT) solution. This solution is usually based on the ranging signals received from at least four global navigation satellites.

A 'satellite based augmentation system' (SBAS) uses a network of geo-stationary satellites and ground stations to enhance the performance of a Global Navigation Satellite System by providing differential correction signals to the navigation receiver users. Satellite based augmentation systems can be the Wide Area Augmentation System (WAAS), the European Geostationary Navigation Overlay System (EGNOS), the Multi-Functional Satellite Augmentation System (MSAS) or any other or future satellite based augmentation system. SBAS satellites usually transmit signals in the same format and on the same frequency as the Global Navigation Satellite System's ranging signals. Hence, devices capable of receiving navigation satellite signals are usually also capable of receiving signals from SBAS systems or any other navigation augmentation system using the same type of ranging signals.

A 'pseudolite' (contraction of the term 'pseudo-satellite') is a device that is not a satellite, but performs a function commonly in the domain of satellites. Pseudolites are most often transceivers that are used to create a local, ground-based satellite alternative in situations where the normal satellite signals are not available (e.g. because they are blocked, jammed, highly attenuated, not existing). Pseudolites can be used for providing a navigation satellite alternative for navigation signal users e.g. in underground parking lots or tunnels. They are also used for testing purposes, for example for emulating a not yet existing navigation satellite constellation. Devices capable of receiving navigation satellite signals are also capable of receiving signals from pseudolites and/or any other device designed to transmit or transceive navigation signals.

A user is enabled to pinpoint his/her geographic location anywhere in the world by means of a device equipped with a global navigation satellite signal reception and processing functionality (hereafter called 'navigation receiver'). FIG. 1 shows a schematic diagram of a navigation receiver. It shows the elementary functional blocks of a navigation receiver (10): antenna (11), receiver radio frequency (RF) front end (13), navigation signal baseband (BB) processor (15) and a navigation processor (17) including the positioning, velocity and time (PVT) calculation software (18) and a receiver configuration & control block (19).

FIG. 2 shows how a navigation receiver (10) can be integrated in a communication device (1) comprising a device for mobile wireless communication (e.g. a mobile telephone) providing the user the combined ability of personal wireless communication and navigation by means of an application processor (50). The application processor among other things, transmits the information from the navigation receiver to the end user application, e.g. a map to be displayed on the screen of the navigation device. The wireless communication link can be based on standards such as GSM, WCDMA, UMTS, CDMA2000, EDGE, GPRS or any future communication scheme. FIG. 2 shows how a navigation receiver (10) and a communications transmitter/receiver (20) can co-exist. A means for interaction between the communication transceiver (20) and the navigation receiver (10) can be provided for assisted global satellite navigation.

Assisted global satellite navigation is an enhanced satellite navigation concept that uses a so called assistance data server and a communications network to aid the navigation operation of a navigation receiver by means of the interaction possibility between the communication receiver and navigation receiver. At start-up, i.e. when a navigation receiver is powered up, it takes a considerable amount of time for the receiver to receive, track and process all the satellite signals before being able to provide the application processor with acceptable position, velocity and time information. Navigation assistance functionality enables a device containing at least both a navigation receiver and a wireless communications receiver with interacting possibilities to perform a faster reception, acquisition, tracking and processing of the navigation satellite's signals at start-up based on assistance data (reference location, reference time, corrections and satellite information). The assistance data is transmitted from the assistance server via the communications network, handled by the device's communication receiver and transmitted to the navigation receiver. The interaction port (assistance data port) between the wireless communication and the navigation receiver is used in order to transfer the assistance data.

The assistance data can be employed by the navigation receiver at two different levels, as shown in FIG. 3: either at the level of the navigation signal baseband processor (15) for speeding up the acquisition and tracking or at the level of the navigation processor (17) for increasing the speed of the position, velocity and time calculation. Both possibilities can be implemented together as well.

The design and manufacturing test of mobile communication devices nowadays can be automated to a great extent. State of the art test hardware for e.g. mobile phone manufacturing can be used at the end of the production line for pass/fail decisions. The test device establishes a test-call to the device under test and performs hardware verification, protocol, performance and conformance tests on the device under test during that test-call. It is obvious that, in particular for manufacturing test, a high level of automation and test time reduction is a priority.

When testing the navigation receiver functionality embedded in a communication device, which is enabled both for navigation and wireless mobile communication, several drawbacks are encountered. Firstly, a wired connection to the communication device would be required for testing the navigation functionality (i.e. for reading out test values etc. . . . ). This greatly increases the time needed for the test, which is unacceptable for e.g. production line testing. Secondly, hardware components need to be reconfigured in a test mode and furthermore one needs to wait for a full position fix.

SUMMARY

The present invention aims to provide a method for testing a navigation receiver being a part of a communication device that is also provided with a device for mobile wireless communication. The proposed method overcomes the drawbacks of the prior art solutions.

The present invention relates to a method for testing a navigation receiver comprised in a communication device, whereby the communication device further comprises a device for mobile wireless communication. The method comprises the steps of:
- connecting the communication device to a test equipment device,
- sending navigation assistance data information comprising test configuration data from the test equipment device via the device for mobile wireless communication to the navigation receiver over an assistance data communication port in order to initiate a test procedure, i.e. to program the navigation receiver in a test mode,
- sending test navigation ranging signals from the test equipment device to the navigation receiver,
- processing the test navigation ranging signals in the navigation receiver,
- sending a message concerning said test procedure in response from said navigation receiver to said device for wireless mobile communication,
- feeding back said message to said test equipment device.

In a preferred embodiment the navigation assistance data information comprising test configuration data is sent to the navigation receiver via a communication processor of the device for wireless mobile communication.

Preferably the step of processing the navigation assistance data information comprising test configuration data comprises programming the navigation receiver in test mode. Advantageously said processing step is performed by a navigation processor of said navigation receiver. The navigation assistance data information preferably comprises a test mode identifier. In one embodiment of the invention an acquisition unit of said navigation receiver is programmed for searching for a predetermined navigation signal sequence. Advantageously the predetermined sequence is a navigation ranging signal. The predetermined sequence is typically generated by said test equipment device. In another preferred embodiment the step of sending the message in response is performed after the acquisition unit has synchronised to the predetermined sequence.

In another embodiment the message in response is sent via said assistance data communication port.

Alternatively, the message in response is sent to an application processor of the communication device.

In an advantageous embodiment the navigation receiver is a satellite navigation receiver.

In a specific embodiment the method as previously described can also be applied when the navigation receiver is replaced by a receive-only device comprised in the communication device, said receive-only device being capable of e.g. operating with broadcasting reception schemes like Digital Audio Broadcasting (DAB), Digital Video Broadcasting for handhelds (DVB-h). The navigation assistance data information as used in the method as set out above is then replaced by test data dedicated to the receive-only device. This leads to a method comprising the steps of:
- connecting the communication device to a test equipment device,
- sending test configuration data from the test equipment device via the device for mobile wireless communication to the receive-only device over a test port in order to initiate a test procedure,
- sending test signals dedicated to the receive-only device from the test equipment device to the receive-only device,
- processing the test signals in the receive-only device,
- sending a message concerning the test procedure in response from the receive only device to the device for wireless mobile communication,
- feeding back the message to the test equipment device.

SHORT DESCRIPTION OF THE DRAWINGS

FIG. 3 represents a block diagram of a navigation receiver and the major parts needed in a system capable of assisted navigation.

DETAILED DESCRIPTION

Figure 1:
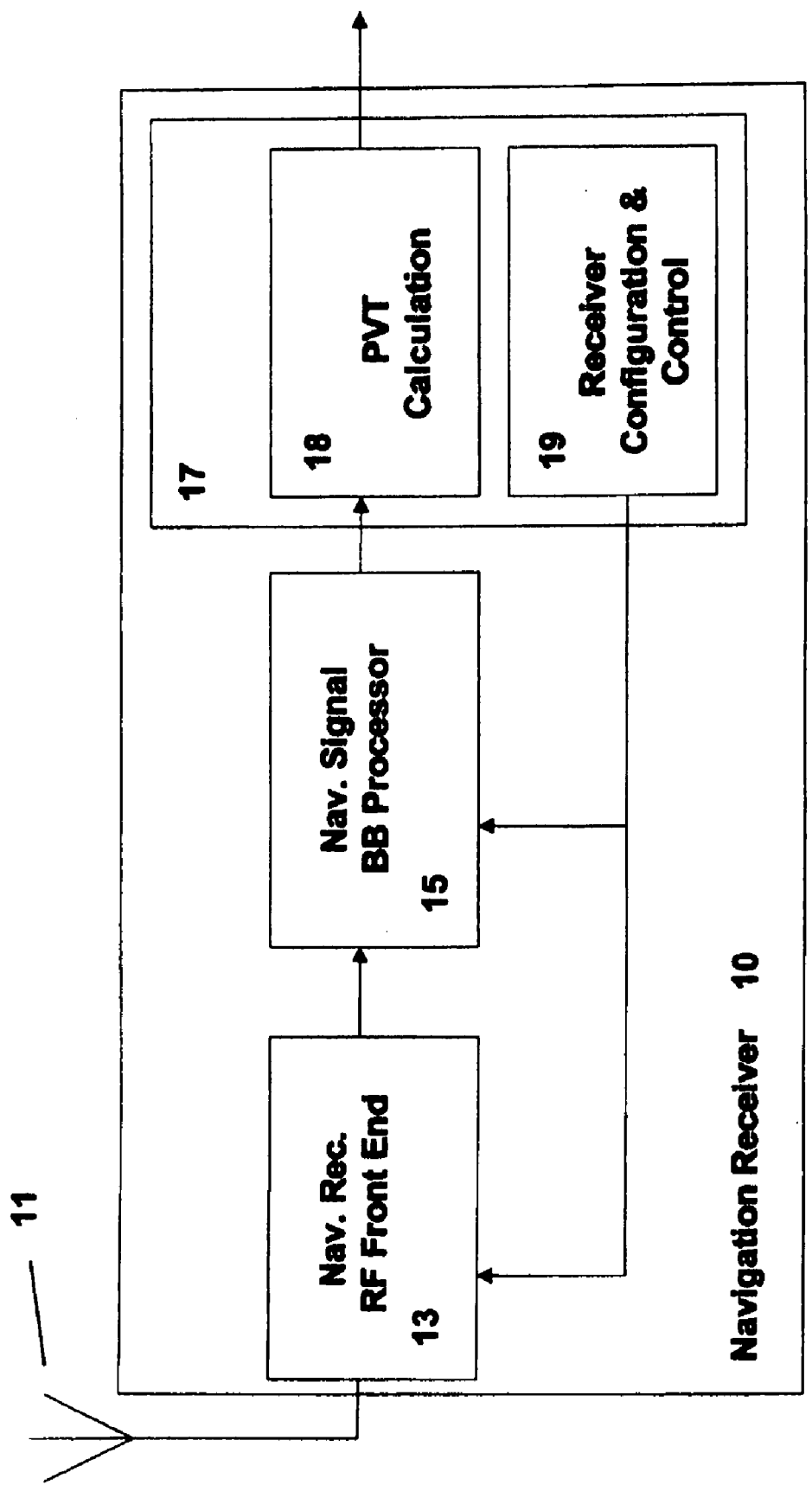
FIG. 1 represents a block diagram of a generic architecture of a navigation receiver and the elementary functional parts needed for operation.
Figure 2:
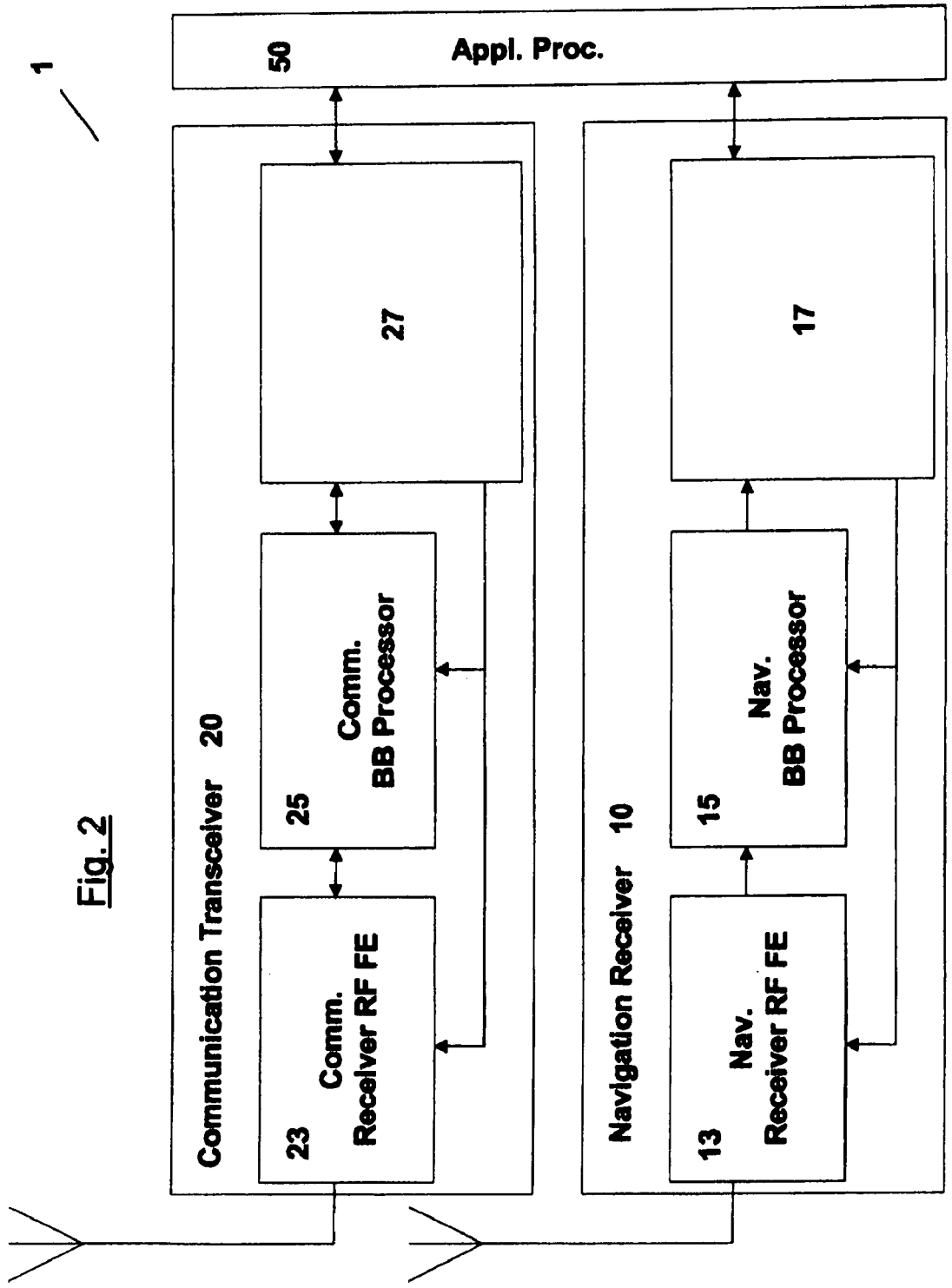
FIG. 2 represents a block diagram of a possible architecture of a device enabled with at least both navigation and wireless communication functionality.

Within this description the term "navigation" designates the act of determining geographic position (positioning), location (locating) and course of any person, vessel or object equipped with a navigation device.

Within this description the term "navigation receiver" also comprises a device capable of receiving SBAS-signals or signals from any other navigation system as well as a device also capable of receiving pseudolite-signals or signals from any other device designed to transmit or transceive navigation signals.

Within this description mainly navigation satellite based systems are envisaged but also pseudolite systems or any other navigation system based on the principle of using ranging signals for navigation purposes.

In the method for testing according to the present invention the dummy data used in the test-call are replaced by test assistance data as described below. In this way also the navigation receiver production test can be integrated with the communication device test in order to reduce test time. The assisted navigation principle and the assistance data port between the communication receiver and the navigation receiver are employed for performing the functionality test.

The method for testing employs navigation assistance data: special test configuration data is provided to the navigation receiver via the assistance data communication port. The test configuration data is provided complementary to or instead of the usual contents of the assistance data.

In the method for testing a navigation receiver is employed provided with extra functionality such that the navigation receiver can be programmed into a test mode by the navigation assistance data.

By using the navigation assistance data and the extra test functionality in the navigation receiver, the receiver can be programmed into a testing mode using the assistance port and all advantages of assisted navigation can be exploited.

Navigation test signals are then provided to the navigation receiver by the test equipment in order to check the functionality and performance requirement specifications of the navigation receiver.

When the navigation receiver has received, acquired and processed the test navigation signals, it returns measurement results to the test equipment in order to determine the correct functioning, the acceptance of the measurement quality and the pass or fail of the navigation receiver test.

Hence, employing the assistance data port for testing purposes, the connections for testing the navigation part of the communication device under test can remain wireless since the wireless communication part of the device is used.

By providing navigation assistance data to the navigation receiver the full navigation receiver chain can be tested in a fast way. Further, all the different connections between the different modules can be tested. The navigation module returns to the test equipment measurement results, e.g. the measured values of the correlation peaks.

In case a bidirectional assistance data communication port exists, the following test procedure is proposed. First the handset is connected with a test equipment device. A regular communication manufacturing test is initiated and performed. At the same time, navigation assistance data comprising test configuration data is provided to the communication processor. The communication processor sends the navigation assistance data to the navigation receiver through the assistance data communication port. This navigation assistance data is recognised by the navigation processor as a manufacturing test mode. Next the navigation processor can program the whole navigation receiver in test mode, setting the acquisition unit looking for a fixed sequence (PRN code). The test equipment generates a fixed sequence. One has to wait until the navigation receiver acquisition unit (in the baseband processor) has found the fixed sequence. When the PRN sequence is found, a message can be sent from the positioning processor in the navigation processor to the communication processor through the assistance data communication port. The communication chain feeds the message back to the test equipment through the wireless communication. The test equipment receives the message and validates the test.

This test procedure can be repeated for different signal levels and/or different PRN codes in order to increase the test coverage. The test procedure enables a full functional test of a navigation receiver in a communication enabled mobile device.

In case a unidirectional assistance data communication port exists, the following modifications to test procedure set out above are proposed. When the PRN sequence is found, a message can be sent from the navigation positioning processor to the application processor through the regular connection between the navigation module and the application module. The application processor sends the PRN sequence through the communication chain to the test equipment by using the wireless communication capability, such that the test equipment receives the message and validates the test.

The invention can be extended to bidirectional communication devices equipped with extra receiver-only devices. As an example, broadcasting reception schemes such as DVB-h, Mobile TV, MediaFLO . . . are receive-only schemes. Through the application processor, the different receivers can be configured in order to be tested in the same way as the positioning receiver capability by means of test data dedicated to the receive-only devices contained in the communication device.

In a manufacturing environment at least the following test aspects are taken into account: speed of test, minimal validation of the receiver with respect to the receiver sensitivity and verification of the Printed Circuit Board (PCB) population. As a navigation receiver device might be included in other electronic equipment at this stage (such as a Cell Phone, PDA, Cars, dog collar) different test strategies can be elaborated. Parallel test of multiple subsystems of the final equipment can be done in parallel with the method disclosed in the present invention in order to save test time.

The invention claimed is:

1. A method for testing a navigation receiver comprised in a communication device, said communication device further comprising a device for mobile wireless communication, comprising:
    connecting said communication device to a test equipment device,
    initiating a test procedure by sending navigation assistance data information from said test equipment device via said device for mobile wireless communication to said navigation receiver over an assistance data communication port, wherein the navigation assistance data information is modified to include test configuration data configured to program the test procedure,
    sending test navigation ranging signals from said test equipment device to said navigation receiver,
    processing said test navigation ranging signals in said navigation receiver,
    sending a message concerning said test procedure in response from said navigation receiver to said device for wireless mobile communication, and
    feeding back said message to said test equipment device.

2. The method of claim 1, wherein said navigation assistance data information is sent to said navigation receiver via a communication processor of said device for wireless mobile communication.

3. The method of claim 1, wherein processing said navigation assistance data information comprises programming said navigation receiver in test mode.

4. The method of claim 1, wherein processing said test navigation ranging signals in said navigation receiver is performed by a navigation processor of said receiver for wireless mobile communication.

5. The method of claim 3, wherein said navigation assistance data information comprises a test mode identifier.

6. The method of claim 3, wherein an acquisition unit of said navigation receiver is programmed for searching for a predetermined navigation signal sequence.

7. The method of claim 6, wherein said predetermined sequence is a navigation ranging signal.

8. The method of claim 6, wherein said predetermined sequence is generated by said test equipment device.

9. The method of claim 6, wherein sending said message in response is performed after said acquisition unit has synchronised to said predetermined sequence.

10. The method of claim 1, wherein said message in response is sent via said assistance data communication port.

11. The method of claim 1, wherein said message in response is sent to an application processor of said communication device.

12. The method of claim 1, wherein said navigation receiver is a satellite navigation receiver.

13. A method for testing a receive-only navigation device comprised in a communication device, said communication device further comprising a device for mobile wireless communication, comprising:

connecting said communication device to a test equipment device, initiating a test procedure by sending navigation assistance data from said test equipment device via said device for mobile wireless communication to said receive-only device over a test port, the navigation assistance data modified to include test configuration data configured to program the test procedure, sending test signals dedicated to said receive-only navigation device from said test equipment device to said receive-only device, processing said test signals in said receive-only navigation device, sending a message concerning said test procedure in response from said receive only navigation device to said device for wireless mobile communication, and feeding back said message to said test equipment device.

* * * * *